US010063651B2

United States Patent
Carter et al.

(10) Patent No.: US 10,063,651 B2
(45) Date of Patent: Aug. 28, 2018

(54) PARALLEL STREAMS TO MAINTAIN A TARGET DATA TRANSFER RATE

(71) Applicant: Spectra Logic Corporation, Boulder, CO (US)

(72) Inventors: Joshua Daniel Carter, Lafayette, CO (US); Jason Frederick Stevens, Longmont, CO (US)

(73) Assignee: Spectra Logic, Corp., Boulder, CO (US)

( * ) Notice: Subject to any disclaimer, the term of this patent is extended or adjusted under 35 U.S.C. 154(b) by 397 days.

(21) Appl. No.: 14/788,501

(22) Filed: Jun. 30, 2015

(65) Prior Publication Data

US 2017/0004153 A1    Jan. 5, 2017

(51) Int. Cl.
*H04L 29/08* (2006.01)
*G06F 11/14* (2006.01)

(52) U.S. Cl.
CPC .......... *H04L 67/2842* (2013.01); *G06F 11/14* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 6,085,251 A * | 7/2000 | Fabozzi, II | ............. | H04L 29/06 709/203 |
| 6,772,217 B1 * | 8/2004 | Baumann | ................ | H04L 47/10 370/395.41 |
| 9,678,981 B1 * | 6/2017 | Taylor | ............... | G06F 17/30194 |
| 2004/0068575 A1 * | 4/2004 | Cruise | ..................... | H04L 69/16 709/232 |
| 2010/0332452 A1 * | 12/2010 | Hsu | .................... | G06F 17/30156 707/640 |
| 2010/0333116 A1 * | 12/2010 | Prahlad | ............. | G06F 17/30082 719/328 |
| 2014/0324928 A1 * | 10/2014 | Tinker | ............. | G06F 17/30203 707/827 |
| 2015/0074217 A1 * | 3/2015 | Werr | ....................... | H04L 67/06 709/212 |

* cited by examiner

*Primary Examiner* — Philip Chea
*Assistant Examiner* — Hassan Khan
(74) *Attorney, Agent, or Firm* — Kenneth Altshuler

(57) ABSTRACT

Apparatus and associated method contemplating sending a bulk request to a first archive storage controller to transfer application data from a server at a target transfer rate, the first archive storage controller residing within a complex of archive storage controllers; identifying two or more archive storage controllers in the complex collectively forming a speed matching buffer set capable of parallel streaming the application data at a data transfer rate that is at least the target transfer rate; and as a result of the identifying step, apportioning the application data to the speed matching buffer set.

18 Claims, 9 Drawing Sheets

PARALLEL STREAMS TO MAINTAIN A TARGET DATA TRANSFER RATE

FIELD

The present embodiments relate generally to modifying large data transfers into a plurality of parallel streams that can be processed at or above a target data transfer rate.

BACKGROUND

Information and management computer applications are used extensively to track and manage data relevant to an enterprise, such as marketing and sales data, manufacturing data, inventory data, and the like. Typically, the application data resides in a centralized database within a distributed storage system, and in a format such as in Oracle, Informix, or SQL and the like. Local applications integrate remote clients and network servers to use and manage the application data, and to make the application data available to remote applications such as via remote function calls (RFCs).

The centralized location of the application data can be problematic in that it places on the enterprise owner the onus of maintaining complex computer systems in order to support the applications. For example, it has traditionally been necessary for the enterprise owner to acquire the knowledge necessary to purchase and maintain the physical storage devices that store the data. To avoid running out of storage space, typically more space is acquired than is actually needed. To avoid losing important data, typically more data is retained than is actually needed. These pitfalls can spiral out of control, resulting in a lack of storage space becoming an emergency or important data being lost or corrupted.

The enterprise owner also disadvantageously has the responsibility for the many administrative details required for efficient and effective data management, such as managing individual utilizations of the physical data storage devices in view of the continually varying network load.

This has caused a proliferation in cloud-based service providers offering remote storage and maintenance of the application data, shifting the need for expertise from the enterprise owner to information technology experts. That advantageously enables the enterprise owner to pay for only the amount of storage space actually used because the charges can be provisioned as the amount of storage changes. Further, shifting the administrative tasks to a contracted service provider frees up the enterprise owner to focus on its core business concerns. It is to an improved solution that the embodiments of the present technology are directed.

SUMMARY

Some embodiments of the claimed technology contemplate a method including: sending a bulk request to a first archive storage controller to transfer application data from a server at a target transfer rate, the first archive storage controller residing within a complex of archive storage controllers; identifying two or more archive storage controllers in the complex collectively forming a speed matching buffer set capable of parallel streaming the application data at a data transfer rate that is at least the target transfer rate; and as a result of the identifying step, apportioning the application data to the speed matching buffer set.

Some embodiments of the claimed technology contemplate a master archive storage controller within a complex of archive storage controllers. The master archive storage controller is programmed with computer instructions stored in computer memory that are configured, in response to receiving a bulk request for transferring application data at a target transfer rate, to define a speed matching buffer set of archive storage controllers within the complex that is capable of parallel streaming the application data at the target transfer rate.

Some embodiments of the claimed technology contemplate a method including: sending a bulk request to a first archive storage controller to transfer application data from a server at a target transfer rate, the first archive storage controller residing within a complex of archive storage controllers and having an individual cache transfer rate that is less than the target transfer rate; identifying two or more archive storage controllers in the complex having individual cache transfer rates that collectively form a speed matching buffer set capable of parallel streaming the application data at a data transfer rate that is at least the target transfer rate; after the identifying step, apportioning the application data to each archive storage controller in the speed matching buffer set; and sending parallel data transfers according to the apportioning step to transfer the application data from the server to the speed matching buffer set at the target transfer rate.

Some embodiments of the claimed technology contemplate a method including: sending a bulk request from a client to a first archive storage controller, the first archive storage controller residing within a complex of archive storage controllers; identifying one or more archive storage controllers in the complex capable of parallel streaming data corresponding to the bulk request based on predefined resource constraints in the complex; and apportioning the data to the identified archive storage controllers.

Some embodiments of the claimed technology contemplates a method including: sending a bulk request to a first archive storage controller; receiving a plan to send data associated with the bulk request to one or more selected archive storage controllers and acting upon that plan; upon failure of one of the selected archive storage controllers, identifying one or more non-failed archive storage controllers that are capable of parallel streaming the data based on predefined resource constraints; as a result of the identifying step, apportioning the data to the non-failed archive storage controllers.

DETAILED DESCRIPTION

Initially, it is to be appreciated that this disclosure is by way of example only, not by limitation. The power management concepts herein are not limited to use or application with any specific system or method. Thus, although the instrumentalities described herein are for the convenience of explanation, shown and described with respect to exemplary embodiments, it will be appreciated that the principles herein may be applied equally in other types of systems and methods involving interfacing object storage with a selectively powered storage device system.

Figure 1:
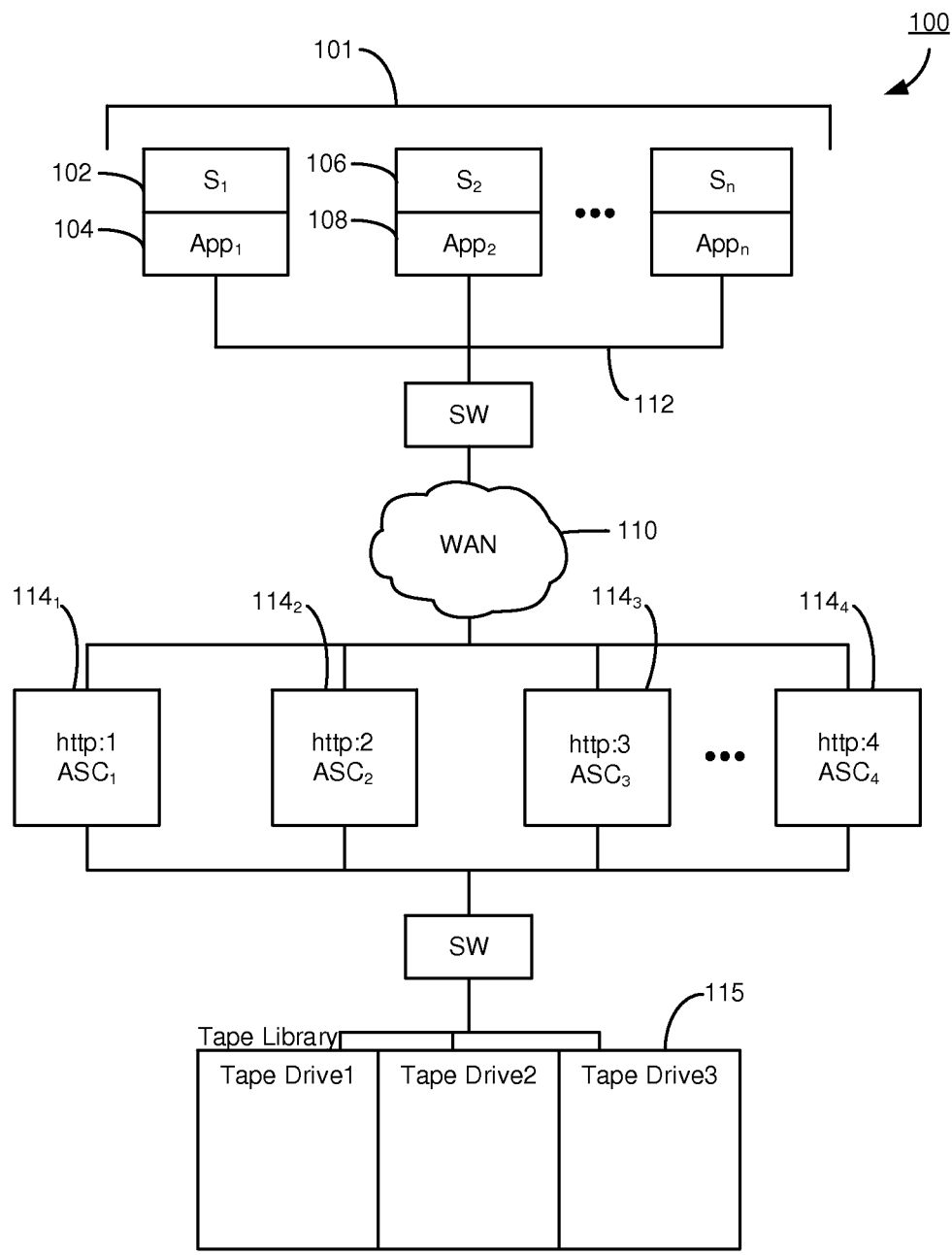
FIG. 1 is a simplified block depiction of a distributed storage system constructed in accordance with illustrative embodiments of the present technology.

To illustrate an exemplary environment in which preferred embodiments of the present technology can be advantageously practiced, FIG. 1 is a simplified depiction of a distributed storage system 100 in which a server cluster 101 includes a first server 102 executing a first application (APP1) 104, and a second server 106 executing a second application (APP2) 108. The circuitries represented by the block depiction in FIG. 1 and otherwise throughout this description generally can be embodied in a single integrated circuit or can be distributed among a number of discrete circuits as desired.

A detailed description of the computer applications APP1, APP2 is unnecessary for the skilled artisan to understand the scope of the claimed technology. Generally, APP1 and APP2 can be any type of computer application such as but not limited to a point of sale application, an inventory application, a supply-chain application, a manufacturing application, and the like. The servers 102, 106 communicate with each other via a communications link 112, such as a local area network (LAN). Although not depicted, in alternative embodiments the servers 102, 106 can be remotely located from each other and communicate individually via a wide area network 110, such as a fibre-channel based switching network or other configurations, including the Internet. In any event, the servers 102, 106 transfer application data to and retrieve application data from the network 110 in the normal course of executing the respective applications APP1, APP2.

A complex (group connected by a network link) of archive storage controllers (ASCs) 114$_1$, 114$_2$, 114$_3$, . . . 114$_n$, stores backup copies (backups) of the application data, and can provision the backups to a backend deep storage device such as the tape library depicted in these illustrative embodiments.

Although not depicted in FIG. 1, it will be understood that backup logic resides within the storage system 100 to provide top level control of what backups of the application data are obtained, and how long the backups are retained. To that end, the backup logic enforces policy rules that are established by an administrator (a skilled information technology person managing the storage system 100). The administrator can control parametric inputs that define the backup policy rules. Although in the illustrative embodiments of this description the backup policy rules are the same for both the APP1 data and the APP2 data, in alternative embodiments the APP1 data and the APP2 data can have different, individual backup policy rules. The backup logic can include snapshot rules (an entire copy of stored data), incremental update rules (changes in the stored data between successive snapshots), thinning rules (retention of archived data), and the like. A detailed discussion of employing any particular backup logic is not necessary for the skilled artisan to understand the scope of the claimed subject matter.

The ASC 114 complex can provide a cloud-computing interface for migrating the backups from the servers 102, 106 (sometimes referred to as "clients"). For example, a link application in each server 102, 106, or in some other network device, can send data via the network 110 by implementation of representational state transfer (REST) calls from the link application via object-oriented language. That is, the link application can send and receive data via connection with the respective ASC 114$_i$ configured as a native hypertext transfer protocol (HTTP) device. The link connection with the ASC 114$_i$ is built into the link application so that both sending data to and receiving data from the complex is self-contained and automatically established by the link application when necessary. Generally, the link application maps requests/responses to REST request/response streams to carry out predetermined transfers of data.

Figure 2:
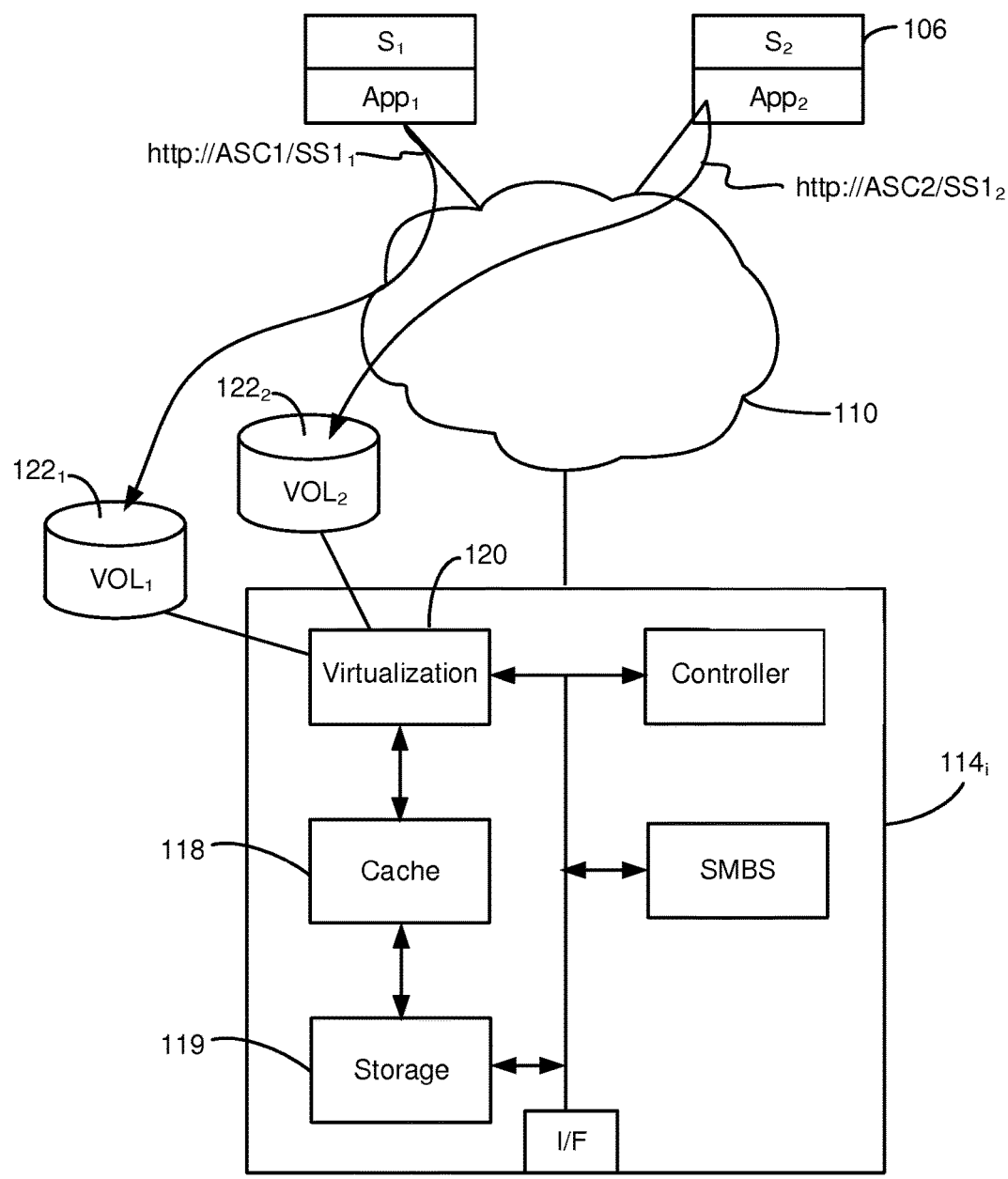
FIG. 2 is a simplified block depiction of a remote server creating logical volumes (containers) in the archive storage controller for APP1 and APP2 backups.
Figure 3:
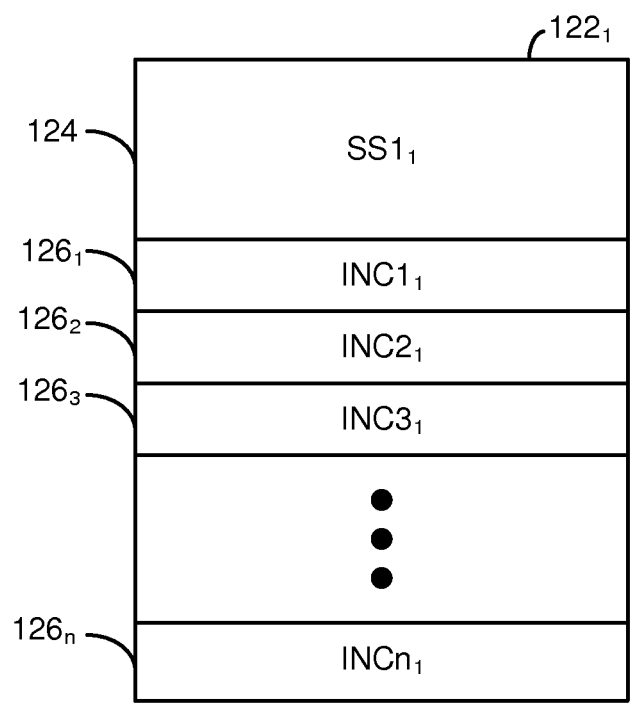
FIG. 3 is a diagrammatic depiction of contents of the logical volume for APP1.

Turning to FIG. 2, the link applications logically organize the backups in a cache memory (or "cache") 118 residing in each ASC 114$_i$. A virtualization module 120 creates a logical storage hierarchy in terms referred to herein as creating a "logical container," or more generally creating a "container" 122 for the backups in the cache 118. Each container 122 and its contents can be identified by strategic use of addressable HTTP uniform resource identifiers (URIs). For this example, it is presumed that first snapshot ("SS") copies are obtained for the applications APP1, APP2 in accordance with the backup logic. The backup logic migrates the first APP1 snapshot ("SS1") copy to a newly created container 122$_1$ by the PUT request https://ASC.APP1.SS1. FIG. 3 depicts the container 122$_1$ contains that first snapshot labeled in terms of its sequential snapshot number and application number, "SS1$_1$," (meaning the first snapshot copy for application APP1), for this example. FIG. 3 also depicts a subsequent point in time when the contents of the container 122$_1$ include the first snapshot SS1$_1$ in the root directory 124 of the container 122$_1$, and a number of incremental updates INC1$_1$, INC2$_1$ . . . INCn$_1$ in respective subdirectories 126 of the container 122$_1$.

Returning to FIG. 2, the backup logic migrates the first APP2 snapshot to a newly created container 122$_2$ by the PUT request https://ASC.APP2.SS1, and so labeled SS1$_2$ (meaning the first snapshot copy for application APP2) for this example. For purposes of this description the term "migrate" means that each backup is transferred to the ASC 114$_i$ without leaving a copy remaining at the source. Alternatively, the backups can be copied to the ASC 114$_i$ while leaving a redundant copy residing at the source.

The cache 118 is only a temporary repository for the backups. Eventually, the ASC 114$_i$ flushes the cached backups to internal data storage capacity 119 to prevent saturation of the cache 118. From that storage 119, the ASC 114$_i$ can further offload the data to a deep storage system, such as the tape library depicted in FIG. 1. Preferably, the backup logic only controls so far as migrating the backups to the containers 122. That is, the backup logic is unaware of and has no control of what happens to the backups after they are migrated to the containers 122. Post-container 122 control is preferably performed by the ASC 114$_i$, with no communication between the server 102, 106 or the backup logic and the ASC 114$_i$ via the network 110.

Figure 4:
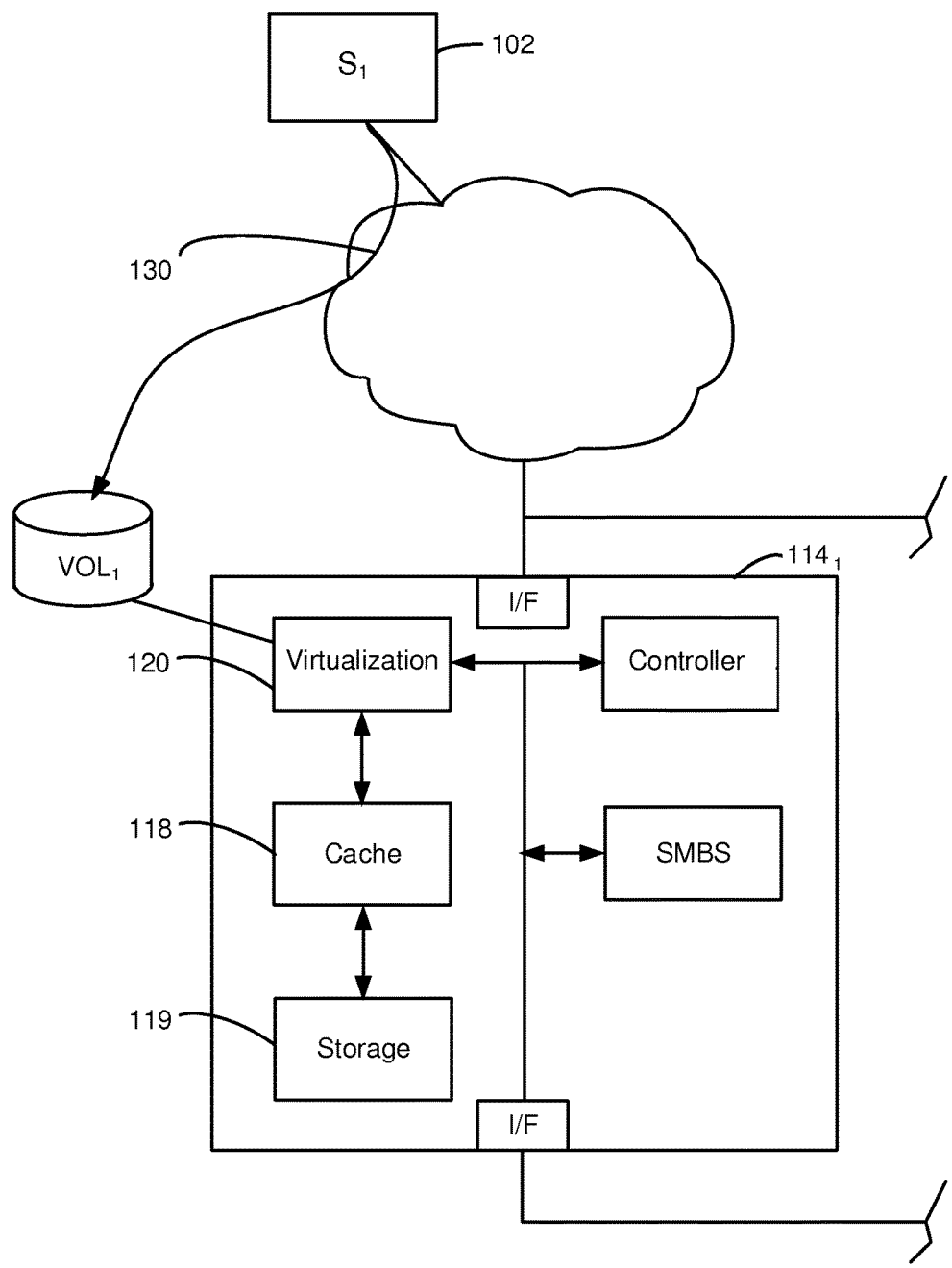
FIG. 4 diagrammatically depicts a server sending a bulk request to the master archive storage controller (ASC).

FIG. 4 depicts the server 102 sending a bulk request 130 to the ASC 114$_1$. A "bulk request" 130 means an atypically large data transfer involving compiling, cataloging, and/or perhaps analyzing stored data. For purposes of this example it will be assumed that the bulk request 130 seeks to transfer ten terabytes (TB) of data to the ASC $114_1$. Without compensating for this large transfer, the ASC $114_1$ would be conceivably tied up with this unusually large transfer for a considerable time, due in part to the fact that performing the large transfer is limited to the transfer rate of the ASC $114_1$. The present technology improves that system throughput performance for large transfers, such as the bulk transfer 130, by apportioning (dividing) the large transfer into two or more parallel streams that are processed by a respective number of ASCs $114_i$. The throughput rate of the parallel streams is the sum of the ASCs $114_i$'s individual transfer rates. For example, two ASCs $114_i$ each having a 500 megabyte (MB) per second cache transfer rate can together transfer 1 GB/sec by processing parallel streams of the bulk request 130 in accordance with embodiments of this technology.

The compensation of this technology is aimed at splitting the bulk request 130 into at least as many parallel streams as is necessary to process the transfer as fast as practicable. In illustrative embodiments a predetermined target transfer rate can be mathematically and/or empirically derived in relation to varying network load. That is, the target transfer rate increases in proportion to the network load in order to prevent cache saturation. For example, FIG. 5 graphically depicts a predetermined graphical relationship between a target data transfer rate and the varying network load.

Figure 6:
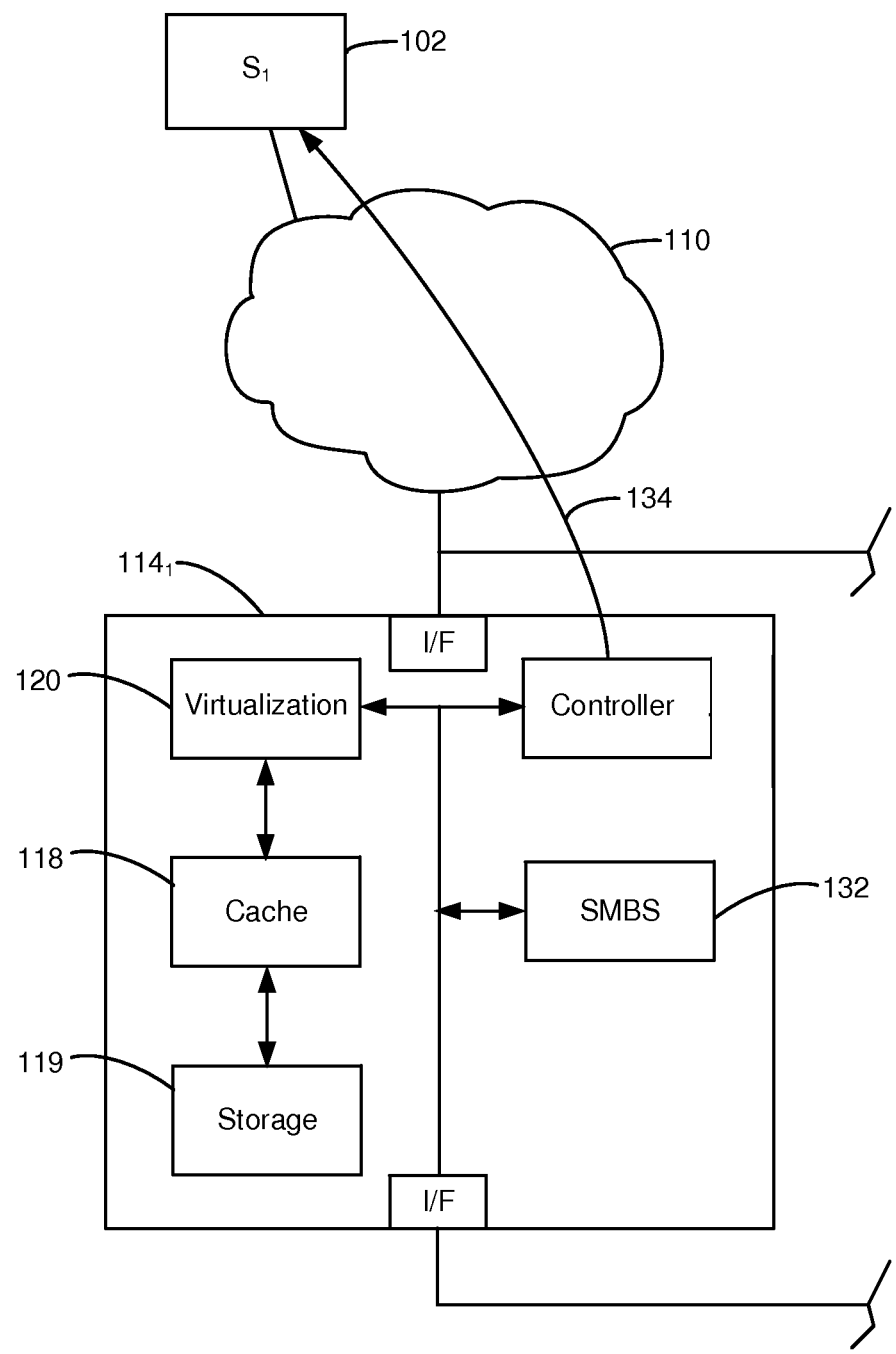
FIG. 6 diagrammatically depicts the master ASC sending a bulk response to the bulk request.

FIG. 6 depicts the ASC $114_1$ includes a speed matching buffer set ("SMBS") module 132 that obtains information from the other ASCs $114_2$, $114_3$, . . . $114_n$ for the purpose of determining which of them to apportion parallel streams to. The first ASC $114_1$ is referred to as the master ASC $114_1$ because it includes the SMBS module 132 for this purpose. All bulk requests 130 are thereby programmed to be sent to the master ASC $114_1$ in order to begin the process of parallel streaming in accordance with this technology. Preferably, another ASC $114_i$ in the complex will also include the SMBS module 132 for redundancy sake, so that in the event of a master ASC 114 failure the system can fail over to the other ASC having the SMBS module 132 as the redundant master.

Figure 5:
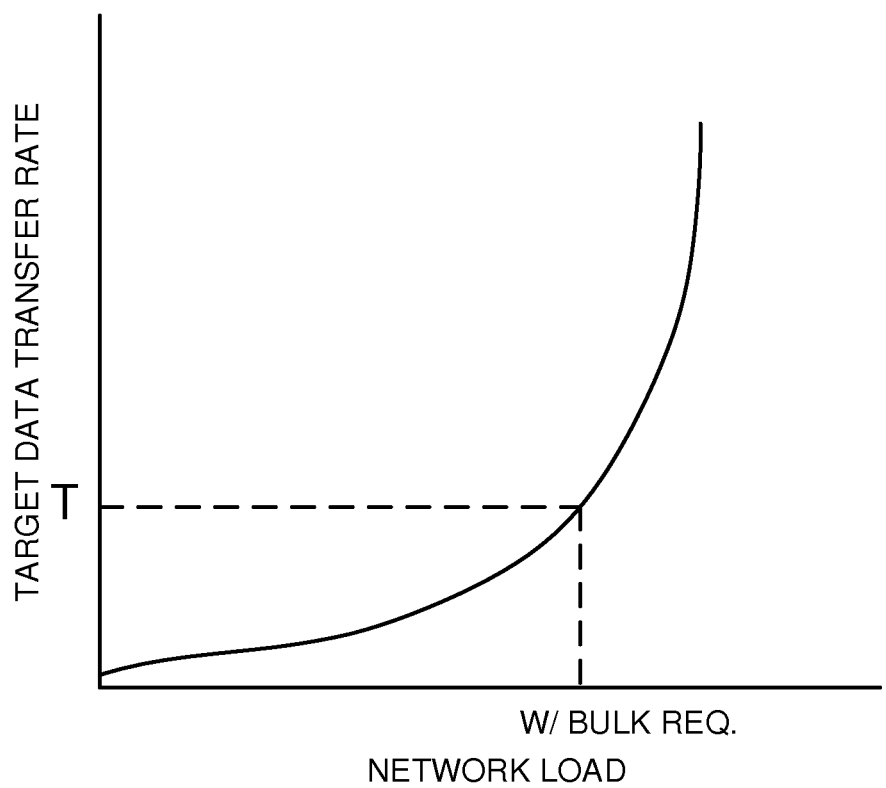
FIG. 5 graphically depicts a derivation of a target data transfer rate for varying network load.

The master ASC $114_1$ in these embodiments first queries the predetermined standard, such as depicted in FIG. 5, to determine the target transfer rate "T" for the current network load that now includes the bulk request 130. The master ASC $114_1$ also queries the other ASCs $114_i$ in the complex to determine which are available for inclusion in the parallel stream distribution.

By "available" it is meant that an ASC $114_i$ is not eliminated from consideration because of a predefined resource constraint. For example, one type of resource constraint can be an ASC $114_i$ reporting a fault state. Other examples of resource constraints include insufficient cache 118 capacity (primary data storage), insufficient internal storage 119 such as storage drives and the like (secondary data storage), insufficient processing capability to perform fingerprinting, compression, encryption, and the like, and insufficient communication bandwidth. Another example of a resource constraint is when the ASC $114_i$ has an excessively high utilization.

When the SMBS module 132 has determined which of the other ASCs $114_i$ are best fits for distributing the parallel streams, the master ASC $114_1$ sends a bulk response 134 to the server 102 that modifies the bulk request 130 to reflect the new apportionment of the parallel streams.

Figure 7:
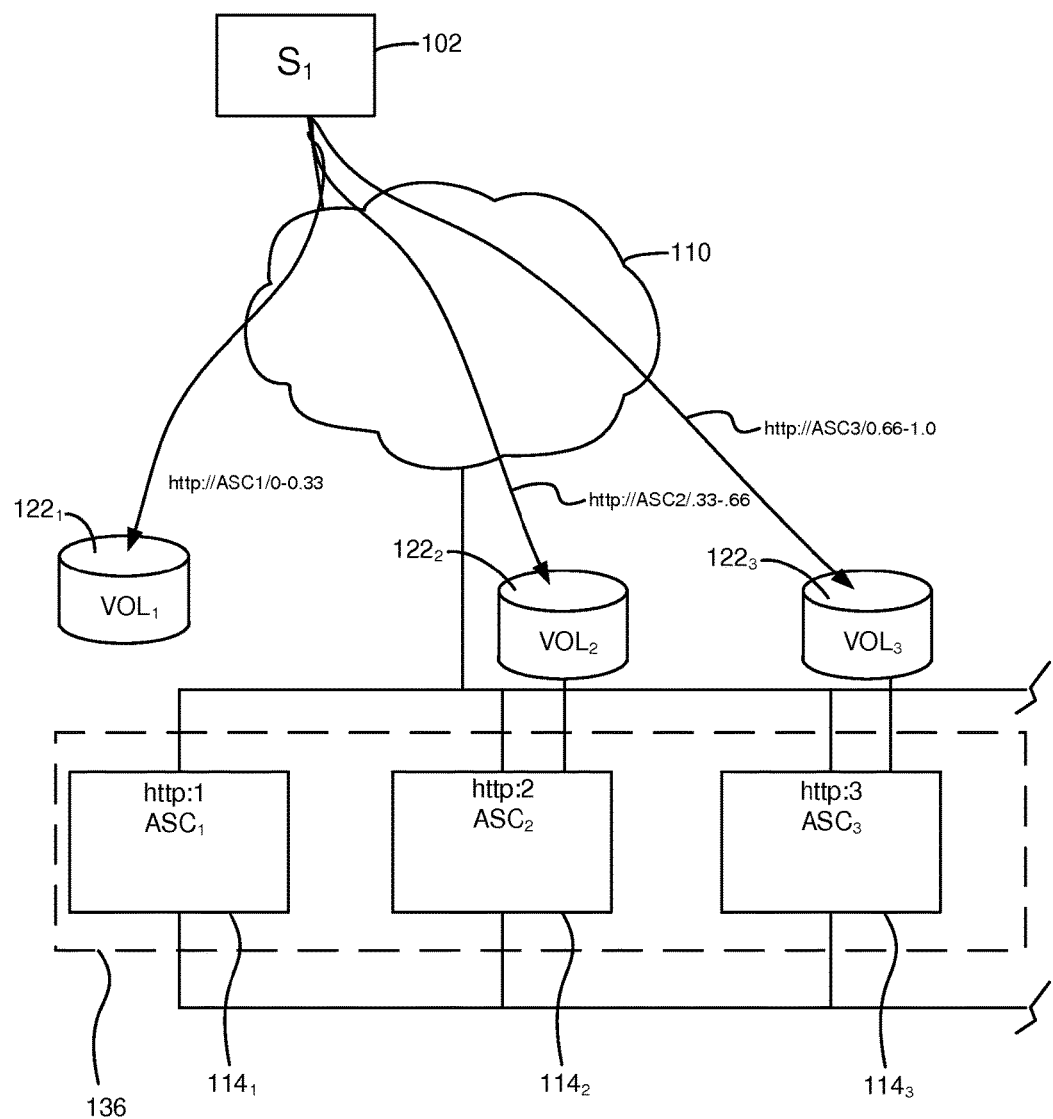
FIG. 7 diagrammatically depicts the bulk response implemented to create three parallel streams to the speed matching buffer set $ASC_1$, $ASC_2$, and $ASC_3$.

FIG. 7 diagrammatically depicts the result of the bulk response 134 in FIG. 6. The SMBS module 132 selected the first three ASCs $114_1$, $114_2$, $114_3$ as a set of ASCs $114_i$ to which the bulk request 130 will be apportioned and processed as parallel data transfer streams. The set of ASCs $114_i$ is referred to herein as the speed matching buffer set ("SMBS") 136 because the collective buffer rate of the three ASCs $114_i$ has been determined to be at least the predetermined target transfer rate "T." In some embodiments the parallel transfer streams can reflect apportioning a first group of data objects to the master ASC $114_1$, a different group of data objects to the second ASC $114_2$, and yet another group of data objects to the third ASC $114_3$. Alternatively, as depicted, the parallel transfer streams can reflect apportioning 33.3% of the bulk request 130 to each of the ASCs $114_i$ forming the SMBS 136. Further, the cache transfer rate of each ASC $114_i$ in the SMBS 136 is not necessarily the same. The apportionment of the bulk request 130 can advantageously be proportional to the cache transfer rate of the respective ASC $114_i$ in the SMBS 136. For example, if the master ASC $114_1$ and the second ASC $114_2$ have a cache transfer rate of 500 MB/sec and the third ASC $114_3$ has a cache transfer rate of 1 GB/sec, then the apportionment can preferably be 25% of the bulk transfer 130 to the master and second ASCs $114_1$, $114_2$ and 50% of the bulk transfer 130 to the third ASC $114_3$.

Although in these illustrative embodiments the SMBS set 136 includes the master ASC $114_1$, the contemplated embodiments are not so limited. The SMBS module 132 can be programmed to preferentially not include the master ASC $114_i$ in achieving the target transfer rate, in order to reserve as much processing capacity as possible for the overhead activities of the master ASC $114_1$ in accordance with this technology.

It is possible that the SMBS 132 needs to change after a parallel transfer stream has begun. If an ASC $114_i$ faults, or if any of the resource constraint conditions change beyond expected boundaries then it is likely that the SMBS 132 is not the optimal allocation of the complex resources. When a predetermined event occurs, such as a fault or a resource constraint change, the master ASC $114_1$ can perform the analysis described above on the remainder of the ASC's $114_i$ to identify a different ASC $114_i$ that is available for the parallel streaming of this technology. The master ASC $114_1$ can then send a redirect response to the client 102 instructing to send the unsent portion of the parallel stream to the newly identified other ASC $114_i$.

Figure 8:
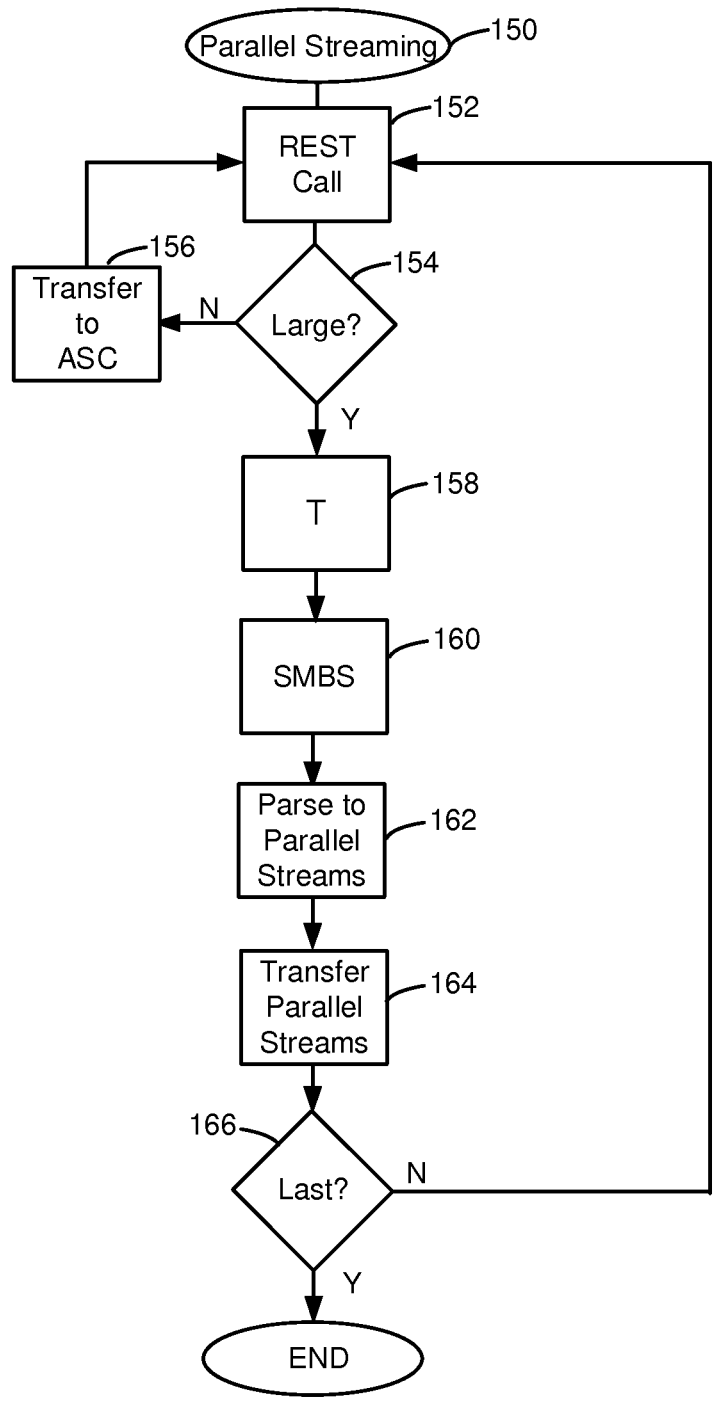
FIG. 8 is a flowchart depicting steps in a method for PARALLEL STREAMING in accordance with illustrative embodiments of the present technology.

FIG. 8 is a flowchart depicting steps in a method 150 for PARALLEL STREAMING that is performed in accordance with embodiments of this technology. The method 150 begins during normal processing of REST calls in block 152. In block 154 it is determined whether the next REST call is for a large transfer, such as for a bulk request (such as 130) in the illustrative embodiments disclosed herein. If the determination of block 154 is "no," the control passes to block 156 where the REST call is processed and then control returns to block 152 for processing the next REST call.

If, on the other hand, the determination of block 154 is "yes," then in block 158 the master ASC (such as $114_1$) ascertains the predetermined target transfer rate (such as "T") for the network load including the large transfer. In block 160 the master ASC also determines the set of ASCs (such as $114_i$) that can best be used to form a set of ASCs (such as the "SMBS") for processing the large transfer by parallel data transfer streams. In block 162 the master ASC sends a response to the large transfer, defining how the large transfer is to be apportioned among the ASCs in the set of ASCs. In block 164 the parallel data streams are transferred according to the ASC's response in block 162. Block 164 includes the redirect processes described above which redefine the SMBS in the event of an ASC $114_i$ fault or an excessive change in a resource constraint during the time a parallel stream is transferring. A redirect response instructs the client to send the unsent remainder of the parallel stream to a newly identified ASC $114_i$ that is best available for transferring the remainder. In block 166 it is determined whether the last REST call has been processed. If the determination of block 166 is no, then control returns to block 152 to process the next REST call; else the method 150 ends.

Figure 9:
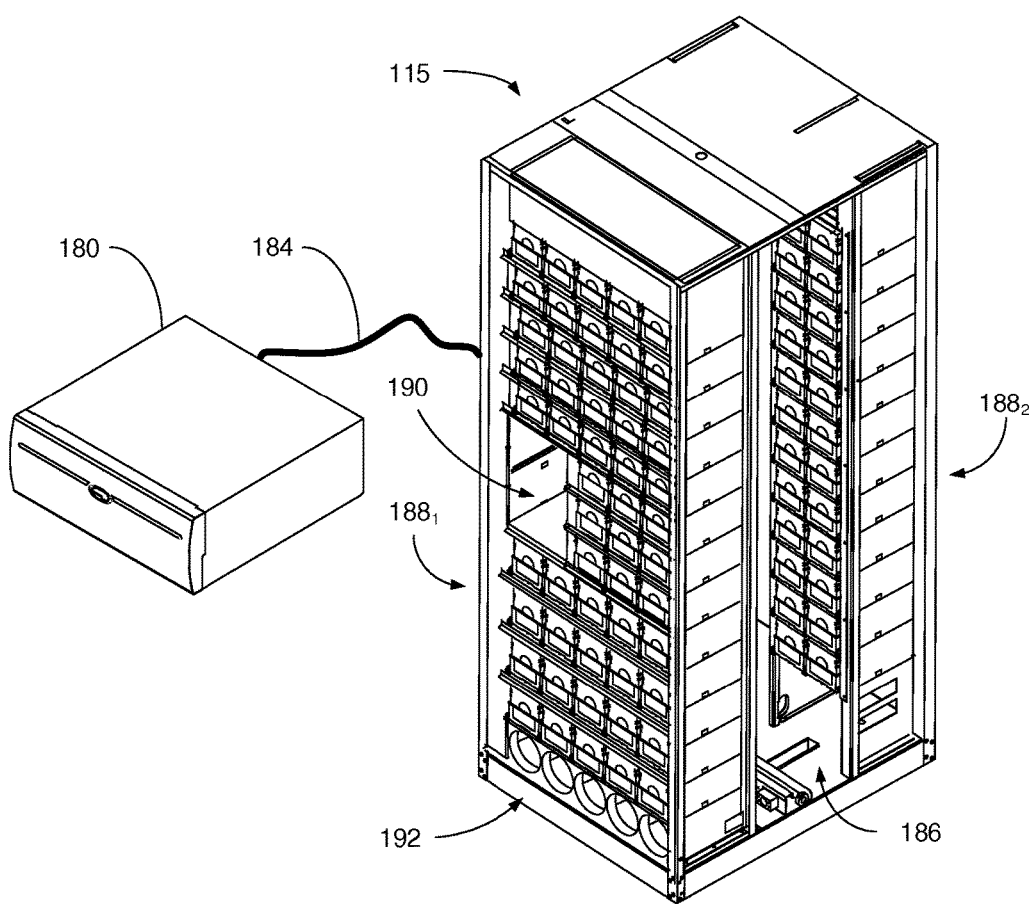
FIG. 9 is an isometric depiction of the ASC of FIG. 1 connected to a tape library for deep backend storage.

Embodiments of the present invention can be commercially practiced in a Black Pearl archive storage system connected to a Spectra Logic T-Finity tape cartridge library on the backend manufactured by Spectra Logic of Boulder, Colo. FIG. 9 shows a commercial embodiment of a Black Pearl archive storage system 180 communicatively linked with the T-Finity unit 115 (see FIG. 1) via a cable 184. The T-Finity unit 115 is depicted without an enclosure. The T-Finity unit 115 as depicted is a single cabinet, but in alternative embodiments multiple cabinets can be combined as necessary to make an expanded tape library or to expand an existing tape library. The Black Pearl archive storage system 180 has an ASC as described herein (not depicted), a plurality of data storage drives (not shown), and software that facilitates receiving data from a server (not shown), caching that data in at least one of the plurality of data storage drives, and storing that data to tape cartridges in the T-Finity library 115. The Black Pearl archive storage system 180 is capable of handling all tape related storage commands without the server's involvement. The T-Finity unit 115 has a first and second shelf system $188_1$, $188_2$ that are adapted to support a plurality of the removable storage devices, such as tape cartridge magazines in these illustrative embodiments. The second shelf system $188_2$ has at least one tape drive (not depicted) adapted to read and write data to and from a tape cartridge. Functionally interposed between the first and second shelf system $188_1$, $188_2$ is a magazine transport space 186. The magazine transport space 186 provides adequate space for a tape cartridge magazine (not depicted) to be moved, via a magazine transport (not depicted), from a position in the shelf system $188_1$, $188_2$ to a tape drive (not depicted). Tape cartridge magazines can be transferred into and out from the T-Finity library via an entry/exit port 190. The T-Finity tape library 115 includes a means for cooling as shown by the fans 192 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, in alternative equivalent embodiments the REST calls can be associated with some purpose other than archiving backups as in the disclosed illustrative embodiments, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a server and a tape library, communication can be received directly by a tape drive, for example, without departing from the scope and spirit of the claimed invention. Further, for purposes of illustration, the tape drive and tape cartridges are used herein to simplify the description for a plurality of tape drives and tape cartridges. Finally, although the preferred embodiments described herein are directed to tape drive systems, and related technology, it will be appreciated by those skilled in the art that the claimed technology can be applied to other systems, without departing from the spirit and scope of the present technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method for archiving data from a server cluster to a backend data storage device via a computer network, the method comprising:
   placing a complex of archive storage controllers in the network, the complex including a master archive storage controller having a speed matching buffer set module;
   the server cluster executing backup logic programmed to send a bulk input/output (I/O) request for a greater than a predetermined-size transfer of archive data to the master archive storage controller; and
   the speed matching buffer set module programmed, responsive to receiving the bulk I/O request, to identify a target transfer rate as defined by the bulk I/O request or by a predetermined relationship to I/O load, to identify identifying a speed matching buffer set of two or more of the archive storage controllers in the complex that are available, for lack of a predefined resource constraint characterized in terms of operational state, data storage capacity, processor capability, bandwidth, or utilization, to collectively transfer the bulk I/O request at the target transfer rate, and to send a bulk I/O response used by the server cluster to modify the bulk I/O request by apportioning it into parallel I/O requests to the speed matching buffer set.

2. The method of claim 1 further comprising the backup logic, responsive to receiving the bulk I/O response, sending the parallel I/O requests to the speed matching buffer set.

3. The method of claim 1 wherein the identifying the speed matching buffer set step does not include the master archive storage controller in the speed matching buffer set.

4. The method of claim 1 wherein the identifying the speed matching buffer set step comprises including more than two archive storage controllers in the speed matching buffer set.

5. The method of claim 1 wherein the speed matching buffer set includes fewer than all of the archive storage controllers in the complex, and wherein the identifying the speed matching buffer set step comprises comparing a cache capacity of respective archive storage controllers within the complex.

6. The method of claim 1 wherein the speed matching buffer set includes fewer than all of the archive storage controllers in the complex, and wherein the identifying the speed matching buffer set step comprises comparing the utilization of respective archive storage controllers within the complex.

7. The method of claim 1 wherein the modifying step comprises apportioning data objects to different archive storage controllers in the speed matching buffer set.

8. The method of claim 1 wherein the modifying step comprises apportioning different portions of the same data object to different archive storage controllers in the speed matching buffer set.

9. The method of claim 1 wherein each of the archive storage controllers in the speed matching buffer set has a respective cache transfer rate, and wherein the modifying step apportions the application data proportionally to the cache transfer rate of the respective archive storage controller in the speed matching buffer set.

10. The method of claim 1 wherein the further comprising failing over master control of the complex to another predefined archive storage controller within the complex.

11. A non-transitory distributed data storage system, comprising:
a server cluster operably executing backup logic for computer applications via input/output (I/O) commands over a computer network;
a backend data storage device configured to store archive data generated by the backup logic;
a complex of archive storage controllers processing the I/O commands to transfer the archive data from the server cluster to the backend data storage device via the computer network, the complex including a master archive storage controller to which the backup logic sends a bulk I/O request for a greater than a predetermined-size data transfer, the master archive storage controller having a speed matching buffer set module programmed, in response to the bulk I/O request, to identify a target transfer rate as defined by the bulk I/O request or by a predefined relationship to I/O load, to identify a speed matching buffer set of two or more of the archive storage controllers in the complex that are available, for lack of a predefined resource constraint in terms of operational state, data storage capacity, processor capability, bandwidth, or utilization, to collectively transfer the bulk I/O request at the target transfer rate, and to send a bulk I/O response that is used by the server cluster to modify the bulk I/O request by apportioning it into parallel I/O requests to the speed matching buffer set.

12. The system of claim 11 wherein the speed matching buffer set module is programmed to modify the bulk request by not apportioning any of the application data to the master archive storage controller.

13. The system of claim 11 wherein the speed matching buffer set module is programmed to define the speed matching buffer set by comparing respective cache capacities of the archive storage controllers within the complex.

14. The system of claim 11 wherein the speed matching buffer set module is programmed to define the speed matching buffer set by comparing respective cache transfer rates of the archive storage controllers within the complex.

15. The system of claim 14 wherein the speed matching buffer set module is programmed to apportion the application data proportionally to the respective archive storage controller cache transfer rate in the speed matching buffer set.

16. The system of claim 11 wherein the speed matching buffer set module is programmed to apportion data objects to different archive storage controllers in the speed matching buffer set and to apportion different portions of the same data object to different archive storage controllers in the speed matching buffer set.

17. The system of claim 11 wherein the speed matching buffer set module is programmed to select the speed matching buffer set based on resource constraints in the complex selected from the group consisting of a faulted archive storage controller, insufficient available primary storage devices, insufficient available secondary storage devices, insufficient available processor capability, and insufficient available communications bandwidth.

18. A non-transitory complex of archive storage controllers for processing input/output (I/O) commands from a server cluster operably executing backup logic for computer applications to store archive data generated by the backup logic with a backend data storage device via a computer network, the complex comprising a master archive storage controller to which the backup logic sends a bulk I/O request for a greater than a predetermined-size data transfer, the master archive storage controller having a speed matching buffer set module programmed, in response to receiving the bulk I/O request, to identify a target transfer rate as defined by the bulk I/O request or by a predefined relationship to I/O load, to identify a speed matching buffer set of two or more of the archive storage controllers in the complex that are available, for lack of a predefined resource constraint in terms of operational state, data storage capacity, processor capability, bandwidth, or utilization, to collectively transfer the bulk I/O request at the target transfer rate, and to send a bulk I/O response used by the server cluster to modify the bulk I/O request by apportioning it into parallel I/O requests to the speed matching buffer set.

* * * * *